(12) United States Patent
Kim

(10) Patent No.: US 9,083,968 B2
(45) Date of Patent: Jul. 14, 2015

(54) MOBILE TERMINAL AND IMAGE DISPLAY METHOD THEREOF

(75) Inventor: Jinchul Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 213 days.

(21) Appl. No.: 13/092,876

(22) Filed: Apr. 22, 2011

(65) Prior Publication Data

US 2012/0046078 A1 Feb. 23, 2012

(30) Foreign Application Priority Data

Aug. 18, 2010 (KR) .................. 10-2010-0079800

(51) Int. Cl.
- H04M 1/00 (2006.01)
- H04N 13/04 (2006.01)
- H04N 13/00 (2006.01)

(52) U.S. Cl.
CPC ....... *H04N 13/0454* (2013.01); *H04N 13/0497* (2013.01); *H04N 13/007* (2013.01); *H04N 13/0404* (2013.01); *H04N 13/0409* (2013.01); *H04N 13/0434* (2013.01)

(58) Field of Classification Search
USPC .................. 455/566; 345/419, 619; 709/206; 348/42, 43, 51, E13.022, E13.024; 386/343, 335, 336, 353, 248
See application file for complete search history.

(56) References Cited

U.S. PATENT DOCUMENTS

| | | | |
|---|---|---|---|
| 6,480,191 B1* | 11/2002 | Balabanovic | 345/419 |
| 6,741,242 B1* | 5/2004 | Itoh et al. | 345/419 |
| 2006/0139448 A1 | 6/2006 | Ha et al. | |
| 2010/0066559 A1* | 3/2010 | Judelson | 340/825.49 |
| 2010/0182402 A1* | 7/2010 | Nakajima et al. | 348/42 |
| 2010/0309202 A1* | 12/2010 | Watanabe | 345/419 |
| 2011/0012896 A1* | 1/2011 | Ji | 345/419 |
| 2011/0033170 A1* | 2/2011 | Ikeda et al. | 386/244 |
| 2011/0164029 A1* | 7/2011 | King et al. | 345/419 |
| 2011/0264749 A1* | 10/2011 | Lovell | 709/206 |
| 2011/0298797 A1* | 12/2011 | Jung et al. | 345/419 |

FOREIGN PATENT DOCUMENTS

| | | |
|---|---|---|
| CN | 1471322 | 1/2004 |
| CN | 1496183 | 5/2004 |
| CN | 101006733 | 7/2007 |

(Continued)

OTHER PUBLICATIONS

State Intellectual Property Office of the People's Republic of China Application Serial No. 201110174006.7, Office Action dated Jul. 19, 2013, 10 pages.

(Continued)

*Primary Examiner* — Junpeng Chen

(74) *Attorney, Agent, or Firm* — Lee, Hong, Degerman, Kang & Waimey

(57) ABSTRACT

A mobile terminal is provided. The mobile terminal may include a display unit and a controller. The display unit may display a plurality of content items. The controller may display the plurality of content items on the display unit as a two-dimensional image and may convert the two-dimensional image corresponding to at least one content item among the plurality of content items into a three-dimensional stereoscopic image to display the three-dimensional stereoscopic image on the display unit when a predetermined event is generated.

10 Claims, 12 Drawing Sheets

(56) References Cited

FOREIGN PATENT DOCUMENTS

| | | |
|---|---|---|
| CN | 101072406 | 11/2007 |
| EP | 1548648 | 6/2005 |

OTHER PUBLICATIONS

European Patent Office Application Serial No. 11172682.4, Search Report dated Apr. 23, 2014, 8 pages.

* cited by examiner

MOBILE TERMINAL AND IMAGE DISPLAY METHOD THEREOF

CROSS-REFERENCE TO RELATED APPLICATIONS

Pursuant to 35 U.S.C. §119(a), this application claims the benefit of earlier filing date and right of priority to Korean Patent Application No. 10-2010-0079800 filed on Aug. 18, 2010, the contents of which is hereby incorporated by reference herein in its entirety.

FIELD OF THE INVENTION

The present invention relates to three-dimensional stereoscopic image technology. More particularly, the invention relates to a mobile terminal capable of selectively providing a two-dimensional image and a three-dimensional stereoscopic image to a user and a method of displaying an image on the mobile terminal.

DESCRIPTION OF THE RELATED ART

Recent trends include providing a three-dimensional stereoscopic image through a mobile terminal. Improvements to hardware and/or software of the mobile terminal for displaying the three-dimensional stereoscopic image on the mobile terminal is necessary.

SUMMARY OF THE INVENTION

In a mobile terminal according to the present invention and a method of displaying an image on the mobile terminal, the mobile terminal selectively displays three-dimensional content items among a plurality of content items as a two-dimensional image or a three-dimensional stereoscopic image so that the display speed and the power consumption of the mobile terminal may be controlled.

According to an aspect of the invention, there is provided a mobile terminal, including a display unit configured to display a plurality of content items, and a controller. The controller is configured to control the display unit to display the plurality of content items as a two-dimensional image, recognize an occurrence of a predetermined event, and control the display unit to convert the two-dimensional image corresponding to at least one content item among the plurality of content items displayed on the display unit into a three-dimensional stereoscopic image displayed on the display unit upon the recognition of the occurrence of the predetermined event.

According to another aspect of the invention, there is provided a mobile terminal, including a display unit configured to display content, and a controller. The controller is configured to control the display unit to display three-dimensional content as a two-dimensional image, recognize an occurrence of a predetermined event while the two-dimensional image is displayed on the display unit, and control the display unit to convert at least a portion of the three-dimensional content displayed as a two-dimensional image into a three-dimensional image displayed on the display unit upon the recognition of the occurrence of the predetermined event.

According to another aspect of the invention, there is provided a method of displaying an image in a mobile terminal. The method includes receiving, from an external apparatus via a communication unit, first image information for displaying a plurality of content items on a display unit as a two-dimensional image, displaying, on the display unit, the plurality of content items as the two-dimensional image based on the received first image information, recognizing, via a controller, an occurrence of a predetermined event, receiving, from the external apparatus via the communication unit, second image information for displaying at least one content item among the plurality of content items as a three-dimensional stereoscopic image after the recognition of the occurrence of the predetermined event, and displaying the at least one content item as the three-dimensional stereoscopic image based on the received first image information and the received second image information corresponding to the at least one content item.

According to another aspect of the invention, there is provided a method of displaying an image in a mobile terminal. The method includes receiving, from an external apparatus via a communication unit, first image information for displaying three-dimensional content on a display unit as a two-dimensional image, displaying, on the display unit, the three-dimensional content as the two-dimensional image based on the received first image information, recognizing, via a controller, an occurrence of a predetermined event, receiving, from the external apparatus via the communication unit, second image information for displaying at least a portion of the three-dimensional content as a three-dimensional stereoscopic image after the recognition of the occurrence of the predetermined event, and displaying the at least a portion of the three-dimensional content as the three-dimensional stereoscopic image based on the received first image information and the received second image information corresponding to the at least a portion of the three-dimensional content.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION

The present invention will now be described more fully with reference to the accompanying drawings, in which exemplary embodiments of the invention are shown. The invention may, however, be embodied in many different forms and should not be construed as being limited to the embodiments set forth herein.

Hereinafter, a mobile terminal related to the present invention will be described in more detail with reference to the accompanying drawings. In the following description, the suffixes "module" and "unit" are used for facilitation of the detailed description of the present invention and do not have meanings or functions different from each other.

The mobile terminal according to the present invention may include mobile phones, smart phones, laptop computers, digital broadcasting terminals, Personal Digital Assistants (PDA), Portable Multimedia Players (PMP), and navigation systems.

Figure 1:
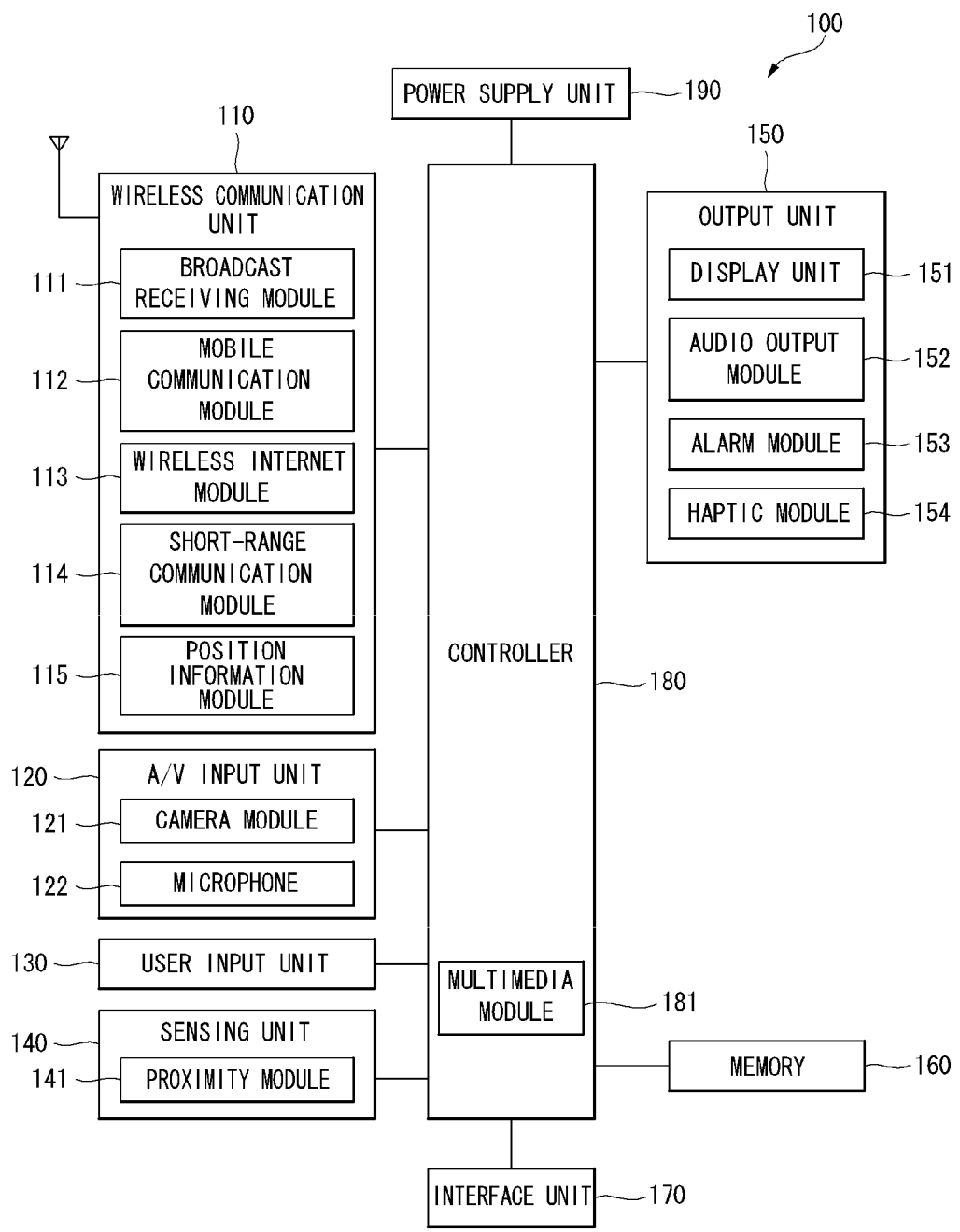
FIG. 1 illustrates a block diagram of a mobile terminal according to an embodiment of the present invention.

Referring to FIG. 1, a mobile terminal 100, as an example of the electronic device 100 related to this invention, is described in detail with reference to the accompanying drawings. FIG. 1 is a block diagram of the mobile terminal 100 according to an embodiment of this invention.

Referring to FIG. 1, the mobile terminal 100 includes a wireless communication unit 110, an audio/video (NV) input unit 120, a user input unit 130, a sensing unit 140, an output unit 150, a memory 160, an interface unit 170, a controller 180, and a power supply unit 190. Although FIG. 1 shows the mobile terminal 100 having various components, it is understood that implementing all of the illustrated components is not a requirement. More or fewer components may alternatively be implemented.

The wireless communication unit 110 includes one or more components that permit wireless communication between the mobile terminal 100 and a wireless communication system or a network within which the mobile terminal 100 is located. For example, the wireless communication unit 110 includes a broadcast receiving module 111, a mobile communication module 112, a wireless Internet module 113, a short-range communication module 114 and a position information module 115. For non-mobile terminals, the wireless communication unit 110 may be replaced with a wired communication unit. The wireless communication unit 110 and the wired communication unit may be commonly referred to as a communication unit.

The broadcast receiving module 111 receives a broadcast signal and/or broadcast associated information from an external broadcast managing entity via a broadcast channel. The broadcast channel may include a satellite channel and/or a terrestrial channel.

The broadcast managing entity may refer to a system that transmits a broadcast signal and/or broadcast associated information. The broadcast managing entity may be a server that generates and transmits broadcast signals and/or broadcast associated information or a server for receiving previously generated broadcast signals and/or broadcast-related information and transmitting the broadcast signals and/or the broadcast associated information to the mobile terminal 100. The broadcast signals may include not only TV broadcast signals, radio broadcast signals, and data broadcast signals, but also signals in the form of a TV broadcast signal combined with a radio broadcast signal.

The broadcast associated information may be information about a broadcast channel, a broadcast program, or a broadcast service provider. The broadcast associated information may even be provided over a mobile communication network. In the latter case, the broadcast associated information may be received via the mobile communication module 112. Examples of broadcast associated information include an electronic program guide (EPG) of digital multimedia broadcasting (DMB) and an electronic service guide (ESG) of digital video broadcast-handheld (DVB-H).

The broadcast receiving module 111 may receive broadcast signals transmitted from various types of broadcast systems. As a non-limiting example, the broadcast systems include digital multimedia broadcasting-terrestrial (DMB-T), digital multimedia broadcasting-satellite (DMB-S), digital video broadcast-handheld (DVB-H), a data broadcasting system known as media forward link only (MediaFLO®) and integrated services digital broadcast-terrestrial (ISDB-T). The broadcast receiving module 111 may also receive multicast signals. The broadcast signals and/or the broadcast associated information received by the broadcast receiving module 111 may be stored in a suitable storage device, such as in the memory 160.

The mobile communication module 112 transmits/receives wireless signals to/from at least one of a base station, an external terminal or a server over a mobile communication network. The wireless signals may represent, for example, voice call signals, video telephony call signals or data in various forms according to the transmission/reception of text and/or multimedia messages.

The wireless Internet module 113 supports Internet access for the mobile terminal 100. This wireless Internet module 113 may be internally or externally coupled to the mobile terminal 100. Suitable technologies for wireless Internet include, but are not limited to, WLAN (Wireless LAN), Wi-Fi®, Wibro® (Wireless broadband), Wimax® (World Interoperability for Microwave Access), and HSDPA (High Speed Downlink Packet Access). The wireless Internet module 113 may be replaced with a wired Internet module in non-mobile terminals. The wireless Internet module 113 and the wired Internet module may be commonly referred to as an Internet module.

The short-range communication module 114 facilitates relatively short-range communications. Suitable technologies for short-range communication include, but are not limited to, radio frequency identification (RFID), infrared data association (IrDA), ultra-wideband (UWB), as well as networking technologies such as Bluetooth® and ZigBee®.

The position information module 115 identifies or otherwise obtains a location of the mobile terminal 100. The position information module 115 may obtain position information by using a global navigation satellite system (GNSS). The GNSS is a term used to describe radio navigation satellite systems configured to send reference signals capable of determining their positions on the surface of the earth or near the surface of the earth while revolving around the earth. The GNSS includes: a global position system (GPS) operated by the U.S.A.; Galileo, operated by Europe; a global orbiting navigational satellite system (GLONASS) operated by Russia; COMPASS, operated by China; and a quasi-zenith satellite system (QZSS) operated by Japan.

As a typical example of the GNSS, the position information module 115 is a GPS module. The position information module 115 may calculate information related to distances between one point or object and at least three satellites and information related to the time when the distance information was measured and apply trigonometry to the obtained distance information to obtain three-dimensional position information on the point or object according to the latitude, longitude, and altitude at a predetermined time. Furthermore, a method of calculating position and time information using three satellites and correcting the calculated position and time information using another satellite may also used. The position information module 115 continues to calculate a current position in real time and to calculate velocity information based on the position information.

With continued reference to FIG. 1, the audio/video (A/V) input unit 120 may be configured to provide audio or video signal input to the mobile terminal 100. The A/V input unit 120 may include a camera module 121 and a microphone 122. The camera module 121 processes image frames of still pictures or video obtained by an image sensor in a photographing mode or a video telephony mode. The processed image frames may be displayed on a display unit 151.

The image frames processed by the camera module 121 may be stored in the memory 160 or transmitted to an external device through the wireless communication unit 110. Optionally, the mobile terminal 100 can include two or more camera modules 121, if appropriate.

The microphone 122 receives an external audio signal while the mobile terminal 100 is in a particular mode, such as a phone call mode, a recording mode and/or a voice recognition mode. The received audio signal is processed and converted into digital data. In the call mode, the processed digital data is transformed into a format transmittable to a mobile communication base station via the mobile communication module 112 and then output. Furthermore, the mobile terminal 100, and in particular the NV input unit 120, may include a noise removing algorithm to remove noise generated in the course of receiving the external audio signal.

The user input unit 130 generates input data in response to user manipulation of an associated input device or devices. Examples of such devices include a keypad, a dome switch, a touchpad (e.g., static pressure/capacitance), a jog wheel and a jog switch. A specific example of the user input unit 130 is a touch screen in which a touchpad is combined with a display, as will be described below.

The sensing unit 140 provides status measurements of various aspects of the mobile terminal 100. For example, the sensing unit 140 may detect an open/closed status of the mobile terminal 100, relative positioning of components (e.g., a display and a keypad) of the mobile terminal 100, a change of position of the mobile terminal 100 or a component of the mobile terminal 100, a presence or absence of user contact with the mobile terminal 100, an orientation of the mobile terminal 100 and/or acceleration/deceleration of the mobile terminal 100.

As an example, the mobile terminal 100 may be configured as a slide-type mobile terminal in which the sensing unit 140 may sense whether a sliding portion of the mobile terminal 100 is open or closed. The sensing unit 140 may also sense presence or absence of power provided by the power supply unit 190 or the presence or absence of a coupling or other connection between the interface unit 170 and an external device.

The output unit 150 generates output relevant to the senses of sight, hearing and touch. The output unit 150 may include a display unit 151, an audio output module 152, an alarm module 153, and a haptic module 154.

The display unit 151 displays information processed by the mobile terminal 100. For example, when the mobile terminal 100 is in a call mode, the display unit 151 may display a user interface (UI) or a graphic user interface (GUI) associated with the call. If the mobile terminal 100 is in a video communication mode or a photograph mode, the display unit 151 may display a photographed and/or received picture, a UI or a GUI.

The display unit 151 may include a liquid crystal display (LCD), a thin film transistor liquid crystal display (TFT LCD), an organic light-emitting diode (OLED), a flexible display, or a 3-dimensional display. The mobile terminal 100 may include one or more of such displays.

The display unit 151 may have a transparent or light-transmittive type configuration, hereinafter referred to as a transparent display. A transparent OLED (TOLED) is an example of a transparent display. A rear configuration of the display unit 151 may also have the light-transmittive type configuration. In this configuration, a user is able to see an object located behind the terminal body via the area occupied by the display unit 151 of the terminal body.

At least two display units 151 may be provided. For example, a plurality of display units 151 may be provided on a single face of the mobile terminal 100 spaced apart from each other or built in one body. Alternatively, each of a plurality of display units 151 may be provided on different faces of the mobile terminal 100.

If the display unit 151 and a sensor for detecting a touch action (hereafter referred to as a 'touch sensor') are constructed in a mutual-layered structure (hereafter referred to as a 'touch screen'), the display unit 151 may be used as an input device and an output device. For example, the touch sensor may include a touch film, a touch sheet or a touchpad.

The touch sensor can be configured to convert a pressure applied to a specific portion of the display unit 151 or a variation of electrostatic capacity generated from a specific portion of the display unit 151 to an electric input signal. The touch sensor may detect a pressure of a touch as well as a touched position or magnitude of the touch.

If a touch input is made to the touch sensor, a signal(s) corresponding to the touch input is transferred to a touch controller (not shown). The touch controller processes the signal(s) and then transfers corresponding data to the controller 180. The controller 180 may determine, therefore, which portion of the display unit 151 is touched.

With continued reference to FIG. 1, a proximity module 141 can be provided within the mobile terminal 100 enclosed by the touch screen or around the touch screen. The proximity module 141 may detect a presence or non-presence of an object approaching a specific detecting surface or an object existing around the proximity module 141 using an electromagnetic field strength or infrared ray without mechanical contact. Accordingly, the proximity module 141 may have greater durability and greater utility than a contact type sensor.

The proximity module 141 can include a transmittive photoelectric sensor, a direct reflective photoelectric sensor, a mirror reflective photoelectric sensor, a radio frequency oscillation proximity module, an electrostatic capacity proximity module, a magnetic proximity module or an infrared proximity module. If the touch screen is an electrostatic type touch screen, the proximity module 141 may detect proximity of a pointer using a variation of an electric field according to the proximity of the pointer and the touch screen (touch sensor) may be classified as the proximity module 141.

An action in which a pointer approaches the touch screen without contacting the touch screen, yet is recognized as being located on the touch screen, is referred to as a 'proximity touch'. An action in which the pointer actually touches the touch screen is referred to as a 'contact touch'. The position on the touch screen proximity-touched by the pointer refers to the position of the pointer that vertically opposes the touch screen when the pointer performs the proximity touch.

The proximity module 141 may detect a proximity touch and/or a proximity touch pattern (e.g., proximity touch distance, proximity touch duration, proximity touch position, proximity touch shift state). Information corresponding to the detected proximity touch action and/or the detected proximity touch pattern may be displayed on the touch screen.

Figure 2:
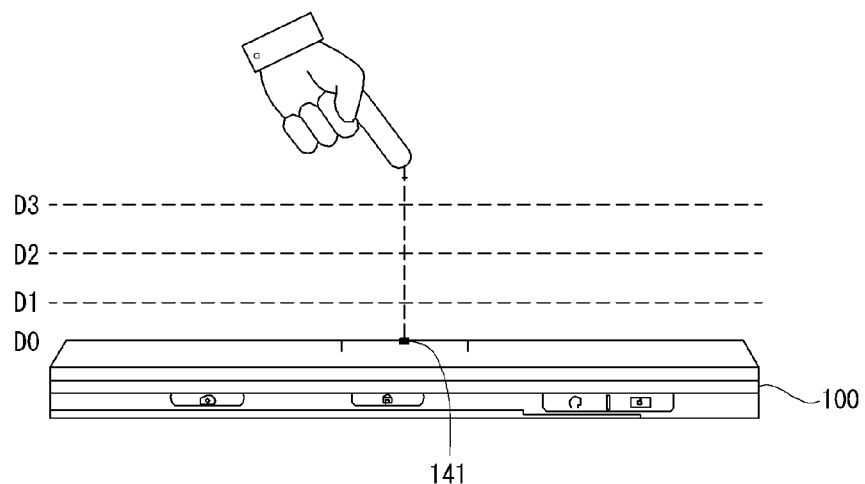
FIG. 2 is a diagram illustrating the proximity depth of a proximity sensor that may be used for the mobile terminal according to the embodiment of the present invention.

The proximity module 141 described with reference to FIG. 1 is described in detail with reference to FIG. 2. FIG. 2 is a diagram for explaining a proximity depth of the proximity module 141. Other embodiments, arrangements and configurations may also be used.

As shown in FIG. 2, when a pointer, such as a user's finger, a pen or a stylus, for example, approaches the touch screen, the proximity module 141 (FIG. 1) provided within or in a vicinity of the touch screen detects the approach of the pointer and outputs a proximity signal. The proximity module 141 can be configured to output a different proximity signal according to a distance between the pointer and the proximity-touched touch screen (hereafter referred to as a proximity depth).

FIG. 2 shows a cross-section of the touch screen provided with the proximity module 141 (FIG. 1) capable of detecting three proximity depths. It is understood that a proximity module 141 capable of detecting more or fewer proximity depths is possible.

If the pointer fully contacts the touch screen (D0), it is recognized as a contact touch. If the pointer is positioned a distance from the touch screen that is less than (D1) but does not fully contact the touch screen, it is recognized as a proximity touch to a first proximity depth. If the pointer is positioned a distance from the touch screen equal to or greater than (D1) and less than (D2), it is recognized as a proximity touch to a second proximity depth. If the pointer is positioned a distance from the touch screen equal to or greater than (D2) or less than (D3), it is recognized as a proximity touch to a third proximity depth. If the pointer is positioned a distance from the touch screen equal to or greater than (D3), no proximity touch is recognized.

The controller 180 (FIG. 1) recognizes the proximity touch as one of various input signals according to proximity depth and position of the pointer. The controller 180 performs various operation controls according to various input signals.

Referring again to FIG. 1, the audio output module 152 may output audio data that is received from the wireless communication unit 110 in, for example, a call-receiving mode, a call-placing mode, a recording mode, a voice recognition mode or a broadcast receiving mode. The audio output module 152 may output audio data stored in the memory 160. The audio output module 152 may output an audio signal relevant to a function (e.g., a call signal receiving sound, a message receiving sound, etc.) performed by the mobile terminal 100. The audio output module 152 may include, for example, a receiver, a speaker or a buzzer.

The alarm module 153 outputs a signal for announcing an occurrence of a particular event associated with the mobile terminal 100. Typical events include a call signal reception, a message reception, a key signal input and a touch input. The alarm module 153 outputs a signal for announcing the event occurrence via vibration as well as a video signal or an audio signal. The video signal is output via the display unit 151 and the audio signal is output via the audio output module 152. Hence, at least the display unit 151 or the audio output module 152 can be regarded as part of the alarm module 153.

The haptic module 154 may generate various haptic effects that can be sensed by a user. Vibration is a representative tactile effect generated by the haptic module 154. Strength and pattern of the vibration generated from the haptic module 154 may be controllable. For example, vibrations differing from each other can be output by being synthesized together or can be output in sequence.

The haptic module 154 may generate various haptic effects in addition to vibration. For example, the haptic module 154 may generate an effect caused by a pin array vertically moving against skin being touched, an air injection force via an injection hole, an air suction force via a suction hole, an effect of skimming on a skin surface, an effect of contact with an electrode, an effect of electrostatic power and/or an effect of a hot/cold sense using an endothermic or exothermic device.

The haptic module 154 can be configured to provide the haptic effect via direct contact. The haptic module 154 can also be configured to enable a user to experience the haptic effect via muscular sense of a finger or an arm. Two or more haptic modules 154 can be provided according to a configuration of the mobile terminal 100.

The memory 160 is configured to store programs for operation of the controller 180. The memory 160 may temporarily store input/output data (e.g., phonebook, message, still picture, moving picture, etc.). The memory 160 may store data of vibration and sound in various patterns output when the touch screen receives a touch input.

The memory 160 may include, for example, a flash memory, a hard disk, a multimedia card micro type memory, a card type memory (e.g., SD memory, XD memory, etc.), a random access memory (RAM), a static random access memory (SRAM), a read-only memory (ROM), an electrically erasable programmable read-only memory (EEPROM), a programmable read-only memory (PROM), a magnetic memory, a magnetic disk or an optical disk. The mobile terminal 100 may operate in association with a web storage that performs a storage function of the memory 160 via the Internet.

The interface unit 170 couples the mobile terminal 100 with external devices. The interface unit 170 receives data from an external device. The interface unit 170 is supplied with power and may be configured to deliver the power to elements within the mobile terminal 100. The interface unit 170 may be configured to enable data to be transferred from the mobile terminal 100 to an external device. The interface unit 170 may be configured to include a wired/wireless headset port, an external charger port, a wire/wireless data port, a memory card port, a port for coupling to a device having an identity module, an audio input/output (I/O) port, a video input/output (I/O) port or an earphone port.

The identity module (not shown) is a chip or card that stores various types of information for authenticating a use authority of the mobile terminal 100 and can include a user identity module (UIM), a subscriber identity module (SIM) and/or a universal subscriber identity module (USIM). A device provided with the above identity module (hereafter referred to as an 'identity device') may be manufactured in the form of a smart card. The identity device is connectable to the mobile terminal 100 via a corresponding port.

The interface unit 170 may be configured as a passage for supplying power to the mobile terminal 100 from a cradle that is connected to the mobile terminal 100. The interface unit 170 may facilitate delivery of various command signals, which are input via the cradle by a user, to the mobile terminal 100. Various command signals input via the cradle or the power may work as a signal for recognizing that the mobile terminal 100 is correctly loaded in the cradle.

The controller 180 typically controls the overall operations of the mobile terminal 100. For example, the controller 180 performs control and processing associated with voice calls, data communications and video conferences. The controller 180 may include a multimedia module 181 that provides multimedia playback. The multimedia module 181 may be configured as part of the controller 180 or may be configured as a separate component. The controller 180 may also perform pattern recognizing processing for recognizing a handwriting input performed on the touch screen as a character and/or recognizing a picture drawing input performed on the touch screen as characters or images.

The power supply unit 190 provides power required by the various components for the mobile terminal 100. The power may be internal power, external power, or combinations thereof.

Figure 3:
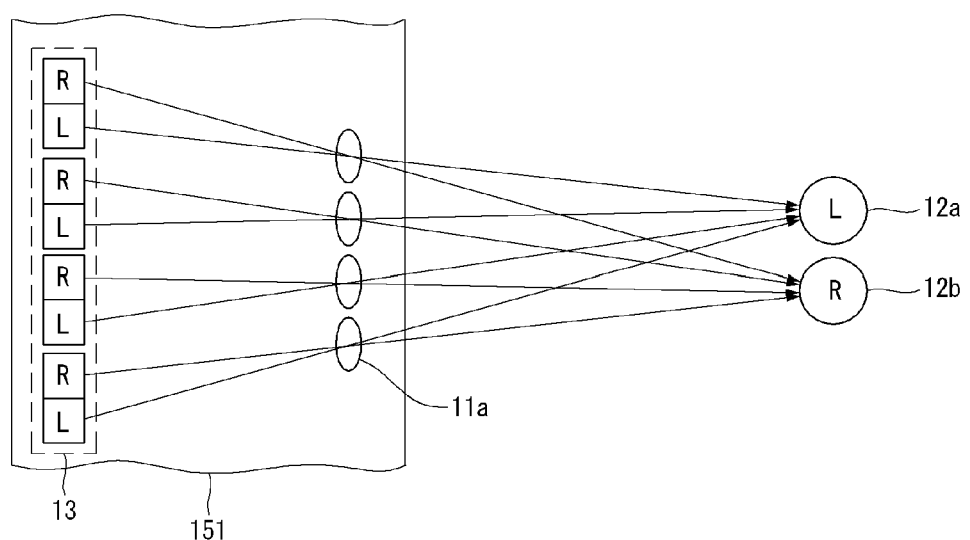
FIGS. 3 and 4 are views illustrating a method of displaying a three-dimensional stereoscopic image using binocular parallax according to the present invention.
Figure 4:
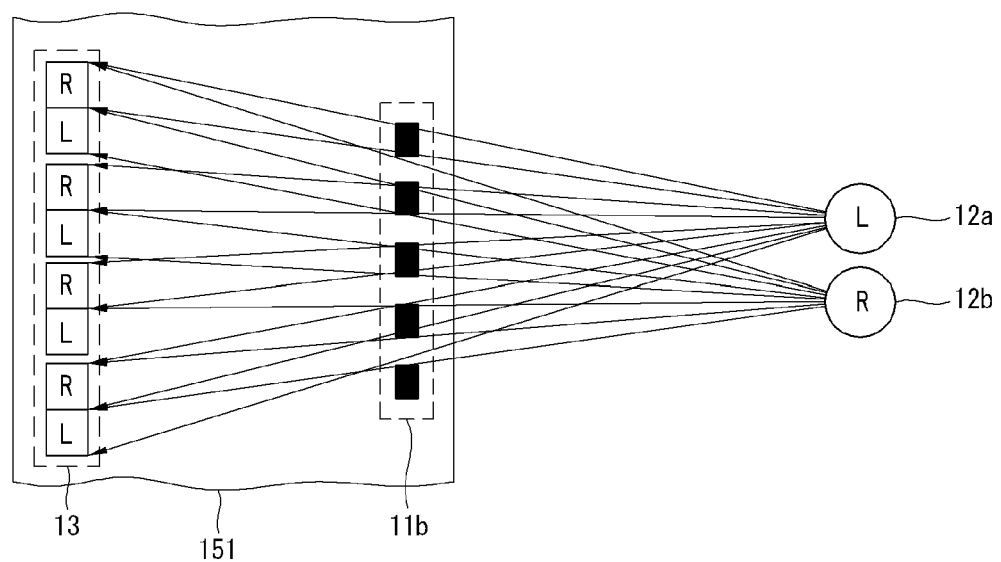

FIGS. 3 and 4 are views illustrating a method of displaying a stereoscopic image using binocular parallax according to the present invention. FIG. 3 illustrates a method in which a lenticular lens array is used and FIG. 4 illustrates a method in which a parallax barrier is used.

Binocular parallax refers to a difference between the sight of human left and right eyes. When a human brain synthesizes the image seen by the left eye with the image seen by the right eye, a stereoscopic effect ensues in which the synthesized images are perceived to have depth. Hereinafter, a phenomenon in which a person experiences the stereoscopic effect in accordance with the binocular parallax is referred to as stereoscopic vision and an image that causes the stereoscopic vision is referred to as a three-dimensional stereoscopic image. In addition, when a specific object included in an image causes the stereoscopic vision, the corresponding object is referred to as a stereoscopic object.

Methods of displaying a three-dimensional stereoscopic image in accordance with the binocular parallax are divided into a glass type, in which special glasses are required, and a non-glass type, in which glasses are not required. The glass type method includes using color glasses having wavelength selectivity, using polarized glasses for a light shielding effect in accordance with a polarization difference, or time division glasses to alternately provide left and right images within the latent image time of eyes. There is also a method of mounting filters having different transmittances in the left and right glasses to obtain the stereoscopic effect with respect to left and right movements in accordance with the time difference of a visuometer, which is caused by a difference in transmittance.

The non-glass type methods in which the stereoscopic effect is generated not by an observer, but by an image display surface, includes a parallax barrier method, a lenticular lens method, or a microlens array method.

Referring to FIG. 3, in order to display the three-dimensional stereoscopic image, the display unit 151 includes a lenticular lens array 11a. The lenticular lens array 11a is positioned between a display surface 13, on which pixels L to be input to a left eye 12a and pixels R to be input to a right eye 12b are alternately arranged in a horizontal direction, and the left and right eyes 12a and 12b. The lenticular lens array 11a provides optical discriminative directivity with respect to the pixels L to be input to the left eye 12a and the pixels R to be input to the right eye 12b. The image that passes through the lenticular lens array 11a is divisionally observed by the left eye 12a and the right eye 12a and a human brain synthesizes the image seen through the left eye 12a with the image seen through the right eye 12b to observe the three-dimensional stereoscopic image.

Referring to FIG. 4, in order to display the three-dimensional stereoscopic image, the display unit 151 includes a perpendicular latticed parallax barrier 11b. The parallax barrier 11b is positioned between the display surface 13, on which the pixels L to be input to the left eye 12a and the pixels R to be input to the right eye 12b are alternately arranged in the horizontal direction, and the left and right eyes 12a and 12b. In this manner, an image is divisionally observed by the left eye 12a and the right eye 12b through a perpendicular latticed aperture. The human brain synthesizes the image seen through the left eye 12a with the image seen through the right eye 12b to observe the three-dimensional stereoscopic image. The parallax barrier 11b is turned on only when the three-dimensional stereoscopic image (two-dimensional image) is to be displayed to separate incident time and is turned off when a plane image is to be displayed to transmit the incident time without being separated.

The above-described methods of displaying a three-dimensional stereoscopic image are for describing the embodiments of the present invention. However, the present invention is not limited to these methods. According to the present invention, the three-dimensional stereoscopic image using the binocular parallax may be displayed using various methods other than the above-described methods.

Above, referring to FIGS. 1 to 4, the common operation and function of the mobile terminal 100 according to the present invention and the technology of displaying the three-dimensional stereoscopic image on the mobile terminal 100 are described. Hereinafter, referring to FIGS. 5 to 14, detailed examples of methods of displaying three-dimensional content on the mobile terminal 100 will be described.

Figure 5:
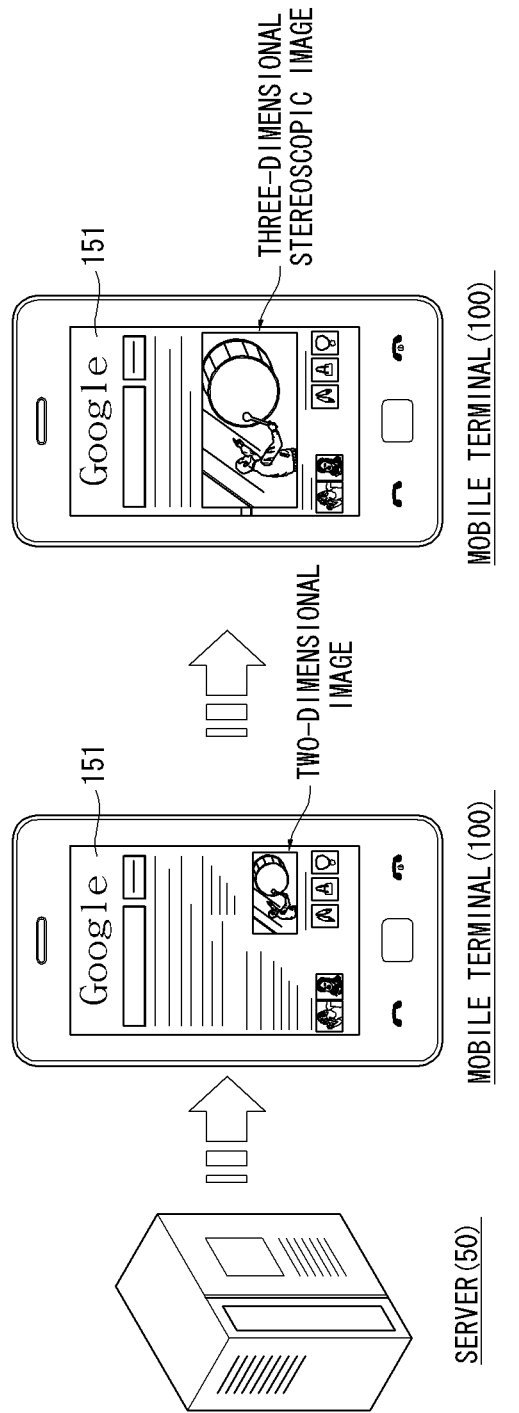
FIG. 5 is a view illustrating a method of displaying an image on the mobile terminal according to an embodiment of the present invention.

FIG. 5 is a view illustrating a method of displaying an image on the mobile terminal 100 according to an embodiment of the present invention. The mobile terminal 100 accesses a web page of a server 50 to receive image information corresponding to a plurality of content items that makes up the web page.

The plurality of content items that makes up the web page includes simple text, hyperlinked text, a simple two-dimensional image, two-dimensional content including a hyperlinked two-dimensional image, a simple three-dimensional stereoscopic image, and three-dimensional content including a hyperlinked three-dimensional image. Here, the image may include a still image or a moving picture.

The mobile terminal 100 according to the present invention is configured to selectively convert the display method of the three-dimensional content in accordance with various conditions. That is, the mobile terminal 100 may display the three-dimensional content on the display unit 151 as a two-dimensional image or may display the three-dimensional content on the display unit 151 as a three-dimensional stereoscopic image. Additionally, the display unit 151 of the mobile terminal 100 may simultaneously display the two-dimensional image and the three-dimensional stereoscopic image on one screen.

With continued reference to FIG. 5, after the plurality of content items included in the web page are displayed as the two-dimensional image, when a selection operation, such as a touch operation of a user, is performed on a specific region of the two-dimensional image, the image corresponding to the specific region of the two-dimensional image is enlarged and displayed as a three-dimensional stereoscopic image.

Here, the specific region refers to a region in which the three-dimensional content is displayed as the two-dimensional image.

The controller 180 (FIG. 1) of the mobile terminal 100 may display all of the plurality of content items on the display unit 151 as the two-dimensional image. For example, as illustrated in FIG. 5, the controller 180 may display all of the content that makes up the web page as the two-dimensional image when the mobile terminal 100 accesses an initial web page.

When the mobile terminal 100 accesses the initial web page, the mobile terminal 100 receives only the image information for displaying the three-dimensional content items as the two-dimensional image through the wireless communication unit 110. To display the three-dimensional content items as the two-dimensional image, only first image information corresponding to only the left eye or the right eye is required for the display unit 151 that is configured to display the three-dimensional stereoscopic image as the two-dimensional image. Both the first image information and second image information, which corresponds to the remaining one of the left eye or the right eye, are required for the display unit 151 to display the three-dimensional stereoscopic image.

The mobile terminal 100 displays the three-dimensional content items as the two-dimensional image when the mobile terminal 100 initially accesses the web page to reduce the amount of received data such as image information, and to increase the speed at which the web page is displayed on the display unit 151 of the mobile terminal 100. When the three-dimensional content is displayed as the two-dimensional image, the speed at which the web page is displayed on the display unit 151 increases and the power consumption of the mobile terminal 100 may be reduced.

According to the present invention, the communication unit that receives the plurality of content items refers to the wireless communication unit 110 illustrated in FIG. 1. However, the scope of the present invention is not limited to the above. For example, the communication unit that receives the plurality of content may be a wired communication unit.

When the plurality of content items included in the web page are being displayed on the display unit 151 as the two-dimensional image or are completely displayed, the mobile terminal 100 may display the two-dimensional image corresponding to the three-dimensional content among the plurality of content items as the three-dimensional stereoscopic image when a predetermined event is generated. At this time, the controller 180 (FIG. 1) may control the wireless communication unit 110 (FIG. 1) to further receive the second image information for displaying the three-dimensional content as the three-dimensional stereoscopic image.

The display unit 151 may be a touch screen and the predetermined event may be an operation of the user touching the two-dimensional image corresponding to the three-dimensional content. The three-dimensional stereoscopic image may be displayed enlarged in comparison with the original two-dimensional image as illustrated in FIG. 5. When a touch operation is performed on the three-dimensional stereoscopic image by the user, the controller 180 (FIG. 1) converts the three-dimensional stereoscopic image back into the two-dimensional image and displays the two-dimensional image on the display unit 151.

The predetermined event may also refer to a lapse of a predetermined time with respect to a point in time at which the mobile terminal 100 accesses the web page through the wireless communication unit 110 (FIG. 1). The predetermined time may be cumulative time spent on all of the content items included in the web page being displayed on the display unit 151.

The mobile terminal 100 may display a part or all of the three-dimensional content included in the web page as the three-dimensional stereoscopic image after all of the content items of the web page are displayed on the display unit 151 as the two-dimensional image. Accordingly, a reduction of the time spent on displaying the initial web page can be achieved.

The predetermined time may vary based on the communication speed between the web page server 50 and the wireless communication unit 110 (FIG. 1). For example, the predetermined time when the communication speed is low may be set to be longer than the predetermined time when the communication speed is high.

In the above description, the touch operation of the user and the lapse of time spent on accessing the web page are included in the predetermined event for displaying the three-dimensional content currently displayed as the two-dimensional image as the three-dimensional stereoscopic image. However, the scope of the present invention is not limited to the above.

For example, the predetermined event may be a determination that a communication speed with the web page server 50 is a predetermined speed or greater such that it is not necessary to display the three-dimensional content as the two-dimensional image in order to increase the speed at which the web page is displayed. When the communication speed with the web page server 50 is reduced to less than the predetermined speed, the controller 180 (FIG. 1) converts the three-dimensional stereoscopic image into the two-dimensional image to display the two-dimensional image on the display unit 151. As described above, various events for designating the point in time at which the three-dimensional content currently displayed as the two-dimensional image is displayed as the three-dimensional image may be included in the predetermined event.

The method of the mobile terminal 100 accessing an external apparatus to display content items is described above with reference to the mobile terminal 100 accessing the web page, as an example. However, the scope of the present invention is not limited to the above. For example, the external apparatus may be one of various electronic apparatuses that may provide the plurality of content items to the mobile terminal 100 to be displayed on the display unit 151.

Figure 6:
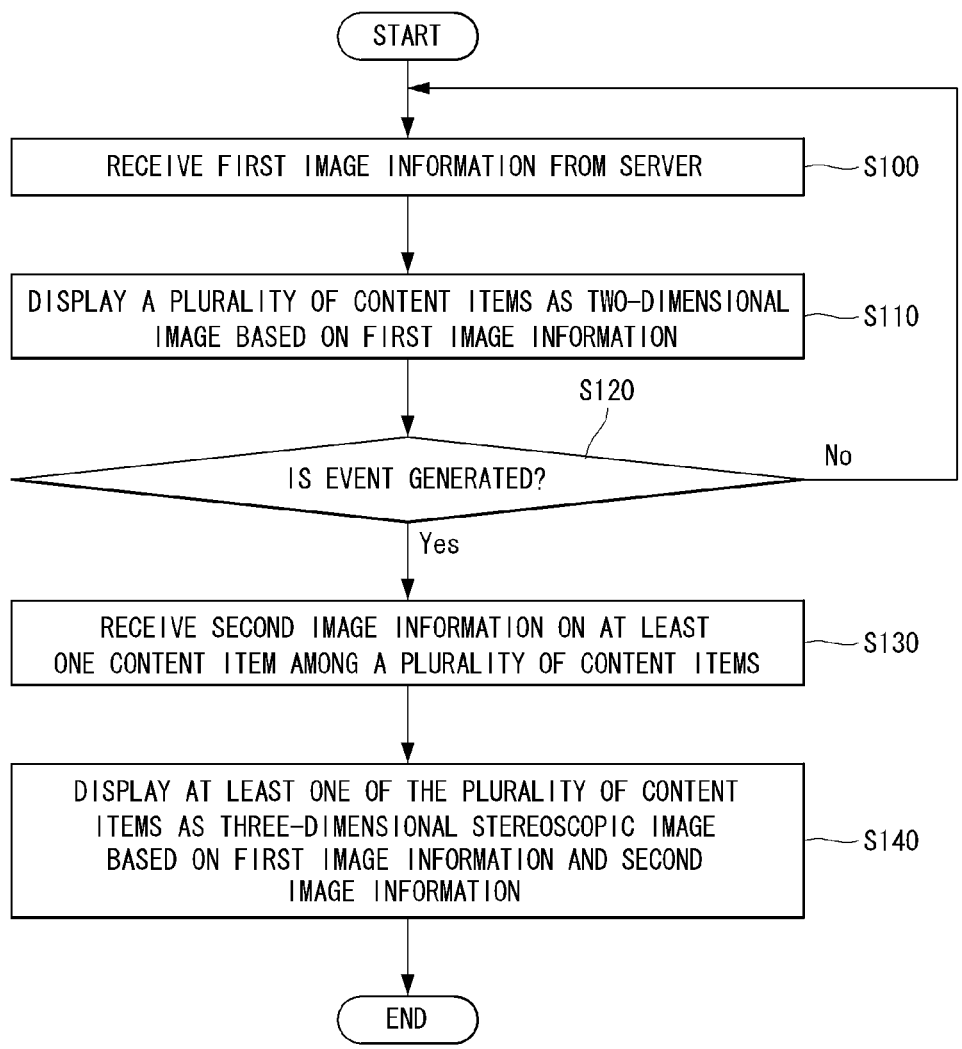
FIG. 6 is a flowchart illustrating the method of displaying an image on the mobile terminal of FIG. 5.

FIG. 6 is a flowchart illustrating the method of displaying an image on the mobile terminal 100 of FIG. 5. The method of FIG. 6 will be described sequentially with reference to FIGS. 1, 5, and 6.

After the mobile terminal 100 (FIG. 5) accesses the web page using the wireless communication unit 110 (FIG. 1), the mobile terminal 100 receives first image information for displaying a plurality of content items on the display unit 151 as a two-dimensional image from the server 50 (FIG. 5) through the wireless communication unit 110 (FIG. 1) (S100). As described above, the first image information may be image information corresponding to the left eye or the right eye for displaying a three-dimensional image.

After the controller 180 (FIG. 1) controls the display unit 151 (FIG. 5) to display the plurality of content items as the two-dimensional image based on the first image information (S110), the controller 180 (FIG. 1) checks whether a predetermined event is generated (S120). When the predetermined event is not generated ("No" at step S120), the mobile terminal 100 (FIG. 5) repeats steps S100 to S120 to display the plurality of content items as the two-dimensional image.

However, when the predetermined event is generated ("Yes" at step S120), the controller 180 (FIG. 1) receives second image information on at least one content item among the plurality of content items (S130). The at least one content item may be the three-dimensional content displayed as the two-dimensional image in accordance with S100 to S120. Then, the controller 180 (FIG. 1) may display the at least one content item on the display unit 151 (FIG. 5) as a three-dimensional stereoscopic image based on the first image information and the second image information related to the at least one content item (S140).

Figure 7:
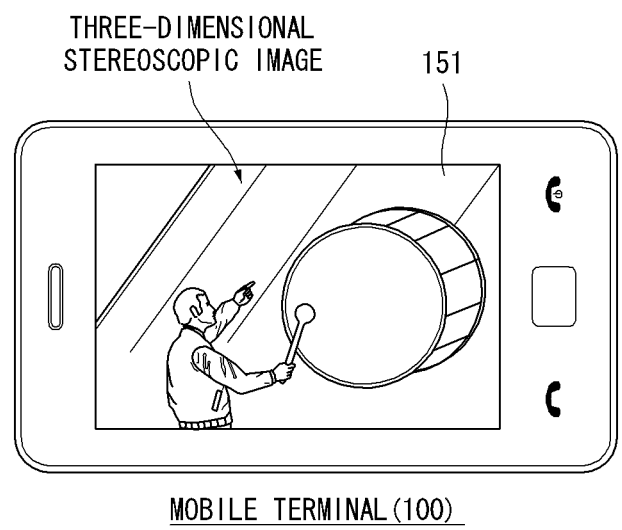
FIG. 7 illustrates an example of a method of displaying three-dimensional content according to the method of displaying an image on the mobile terminal of FIG. 5.

FIG. 7 illustrates an example of a method of displaying three-dimensional content according to the method of displaying an image on the mobile terminal 100 of FIG. 5. Referring to FIG. 7, when the three-dimensional content displayed as the two-dimensional image is enlarged and displayed as a three-dimensional stereoscopic image, the enlarged three-dimensional stereoscopic image may be displayed on the entire screen of the display unit 151.

In accordance with the present invention, the three-dimensional stereoscopic image may be displayed as the two-dimensional image based on the touch operation of a user. In addition, the size of the three-dimensional stereoscopic image may be reduced to the size of the original two-dimensional image or enlarged to the size of the three-dimensional stereoscopic image based on the touch operation of the user.

As described above, the mobile terminal 100 (FIG. 5) may have limitations on displaying the three-dimensional content currently displayed as the two-dimensional image as the three-dimensional stereoscopic image when the predetermined event is generated. For example, when the communication speed with the web page server 50 (FIG. 5) is lower than a predetermined threshold value, there may be limitations on displaying the three-dimensional content currently displayed as the two-dimensional image as the three-dimensional stereoscopic image.

Limitations of the mobile terminal 100 may also apply when the image processing speed of the mobile terminal 100 is lower than the predetermined threshold value. In addition, the user may set limitations on displaying the three-dimensional content currently displayed as the two-dimensional image as the three-dimensional stereoscopic image through environmental settings for the mobile terminal 100 (FIG. 5). An example of such limitations will be described with reference to FIG. 8.

Figure 8:
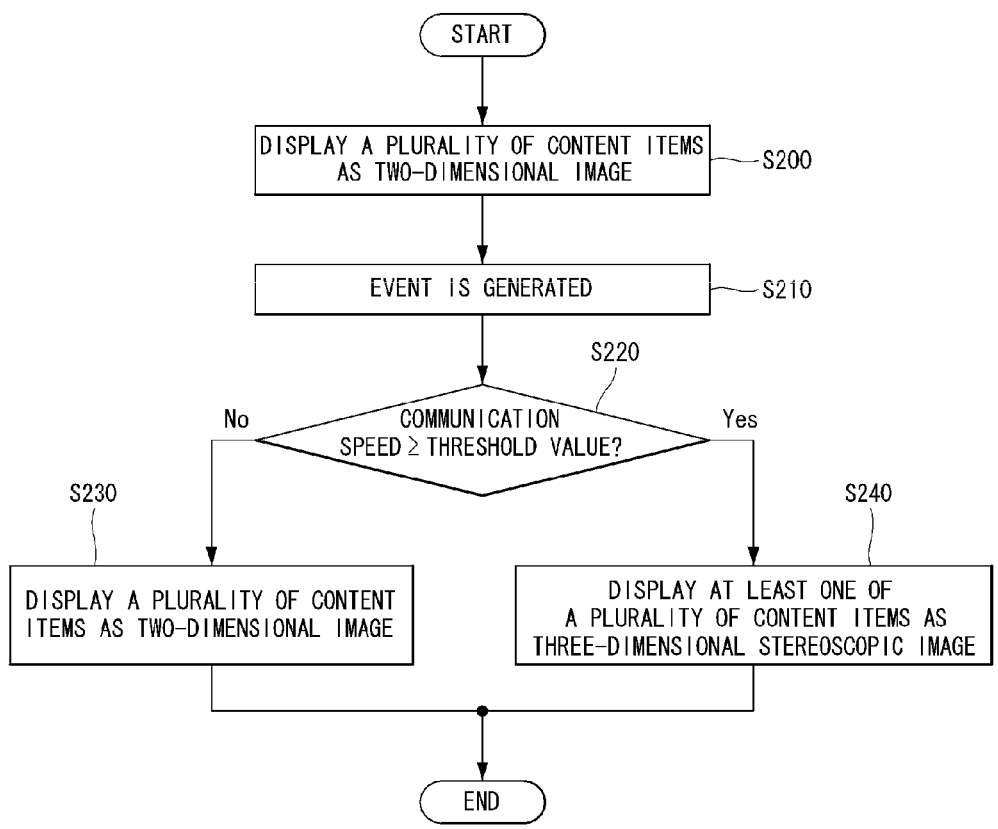
FIG. 8 is a flowchart illustrating a method of displaying an image on a mobile terminal according to an embodiment of the present invention.

FIG. 8 is a flowchart illustrating a method of displaying an image on the mobile terminal 100 (FIG. 5) according to an embodiment of the present invention. The method of FIG. 8 will be described sequentially with reference to FIGS. 1, 5 and 8.

The controller 180 (FIG. 1) of the mobile terminal 100 (FIG. 5) displays a plurality of content items received from an external apparatus on the display unit 151 (FIG. 5) as a two-dimensional image (S200). At least two-dimensional content items or three-dimensional content items may be included in the plurality of content items.

After the plurality of content items are displayed as the two-dimensional image, when a predetermined event, such as the touch operation of a user, is generated (S210), the controller 180 (FIG. 1) determines whether the communication speed between the mobile terminal 100 (FIG. 5) and the external apparatus is the same as or greater than a predetermined threshold value (S220).

When the communication speed is lower than the threshold value ("No" at step S220), the controller 180 (FIG. 1) displays the plurality of content items as the two-dimensional image despite the generation of the event (S230). However, when the communication speed is the same as or greater than the threshold value ("Yes" at step S220), the controller 180 (FIG. 1) displays at least one content item corresponding to the event among the plurality of content items as a three-dimensional stereoscopic image (S240). Since the process of displaying the three-dimensional content currently displayed as the two-dimensional image as the three-dimensional stereoscopic image are described with reference to FIGS. 5 to 7, its description will be omitted.

Figure 9:
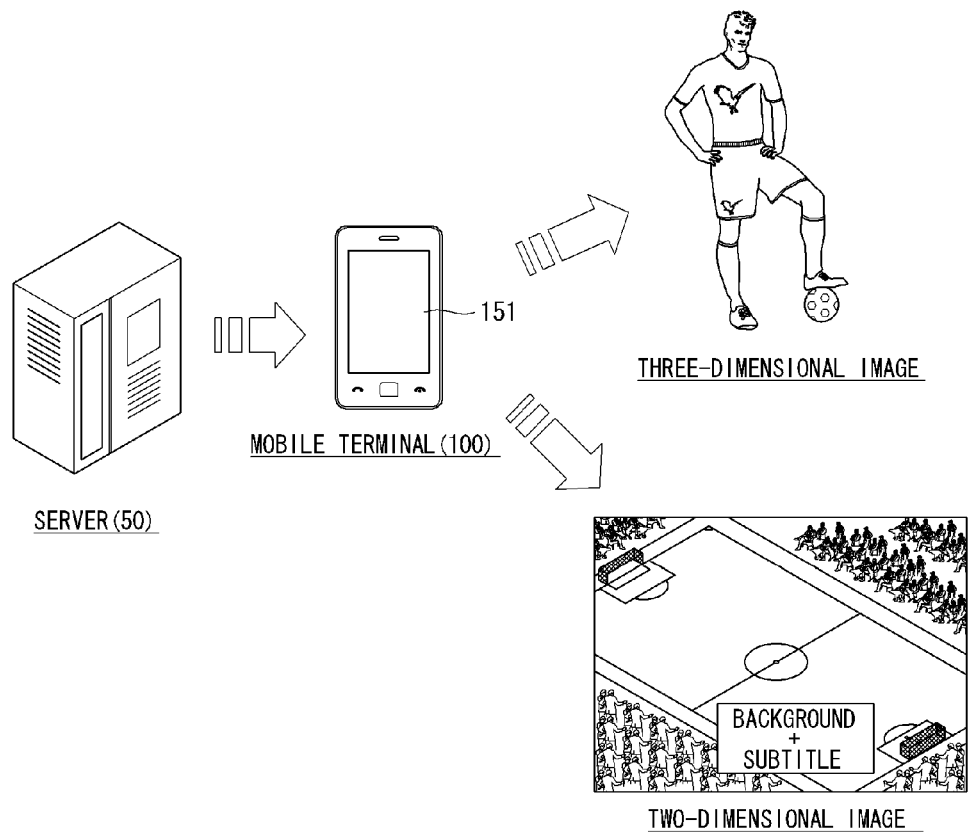
FIG. 9 is a view illustrating a method of displaying an image on the mobile terminal according to an embodiment of the present invention.

FIG. 9 is a view illustrating a method of displaying an image on the mobile terminal 100 according to an embodiment of the present invention. The method of displaying an image on the mobile terminal 100 will be described with reference to FIGS. 1 and 9.

The mobile terminal 100 according to the present invention receives image information corresponding to the three-dimensional content from the server 50 and may display a part of the three-dimensional content as the two-dimensional image and a part of the three-dimensional content as the three-dimensional stereoscopic image based on the received image information. The image information may be received from the server 50 by a streaming method.

Referring to FIG. 9, it is noted that the mobile terminal 100 may display relatively static content items, such as the subtitles and the background of the three-dimensional content with respect to a football game, as the two-dimensional image. The mobile terminal 100 may also display content items having relatively larger amounts of movement, such as football players and a ball, as the three-dimensional stereoscopic image.

The controller 180 (FIG. 1) of the mobile terminal 100 may display the three-dimensional content on the display unit 151 as the two-dimensional image before a predetermined time passes from the point of initial access to the server 50. In other words, the mobile terminal 100 receives only first image information for displaying the three-dimensional content as the two-dimensional image through the wireless communication unit 110 (FIG. 1) during the initial access to the server 50.

The mobile terminal 100 displays the three-dimensional content as the two-dimensional image during the initial access to the server 50 to reduce the amount of received image information and to increase the speed at which the three-dimensional content is displayed on the display unit 151 of the mobile terminal 100. When the three-dimensional content is displayed as the two-dimensional image, the power consumption of the mobile terminal 100 may also be reduced.

When all of the plurality of content items included in the web page are being displayed or are completely displayed on the display unit 151, the mobile terminal 100 may display at least a part of the three-dimensional content currently displayed as the two-dimensional image as the three-dimensional stereoscopic image when the predetermined event is generated. At this time, the controller 180 (FIG. 1) may control the communication unit 110 (FIG. 1) to further receive second image information for displaying at least a part of the three-dimensional content as the three-dimensional stereoscopic image excluding the first image information for displaying at least a part of the three-dimensional content as the two-dimensional image.

Various events for designating the point in time at which a part of the three-dimensional content currently displayed as the two-dimensional image is displayed as the three-dimensional image may be included in the predetermined event. As previously described, such events include the touch operation of the user performed on the two-dimensional image, the lapse of predetermined time with respect to the time of access to the server 50, or the communication speed with the server 50 being at least the same as or greater than the predetermined speed that were previously described.

In accordance with the generation of the predetermined event, at least a part of the three-dimensional content currently displayed as the two-dimensional image may be displayed as the three-dimensional stereoscopic image based on the amount of movement of objects in the three-dimensional content. For example, in the football game image illustrated in FIG. 9, the part corresponding to the football players and the part corresponding to the football may be determined to have larger amounts of movement than other parts. The parts of the three-dimensional content determined to have larger amounts of movement may be displayed as the three-dimensional stereoscopic image. The method of determining the three-dimensional content will be described in detail with reference to FIGS. 10 and 11.

Figure 10:
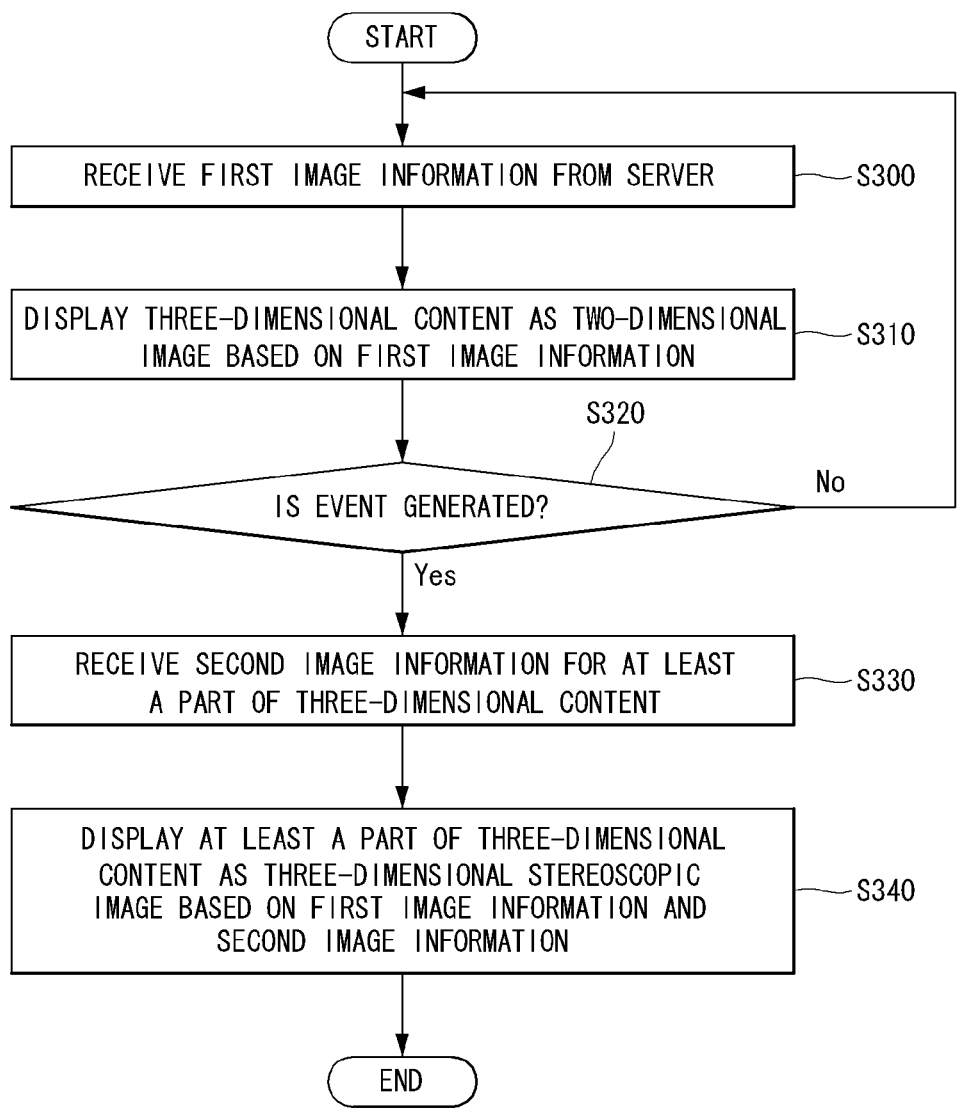
FIG. 10 is a flowchart illustrating the method of displaying an image on the mobile terminal of FIG. 9.

FIG. 10 is a flowchart illustrating the method of displaying an image on the mobile terminal 100 of FIG. 9. The method of FIG. 10 will be described with reference to FIGS. 1, 9, and 10.

The mobile terminal 100 (FIG. 9) receives first image information for displaying three-dimensional content as a two-dimensional image from the server 50 (FIG. 9) via the wireless communication unit 110 (FIG. 1) (S300). The first image information may be image information corresponding to the left eye or the right eye for displaying the three-dimensional content as the two-dimensional image.

The controller 180 (FIG. 1) controls the display unit 151 (FIG. 9) to display the three-dimensional content as the two dimensional image based on the first image information (S310) and then checks whether a predetermined event is generated (S320). When the predetermined event is not generated ("No" at step S320), the mobile terminal 100 (FIG. 9) repeats steps S300 to S320 to display the three-dimensional content as only a two-dimensional image.

However, when the predetermined event is generated ("Yes" at S320), the controller 180 (FIG. 1) receives second image information for at least a part of the three-dimensional content (S330). The at least the part of the three-dimensional content may be predetermined as a part to be displayed as a three-dimensional stereoscopic image in response to the generation of the event ("Yes" at step S320) and may be selected by the controller 180 (FIG. 1).

The controller 180 (FIG. 1) may control the display unit 151 (FIG. 9) to display the at least the part of the three-dimensional content as the three-dimensional stereoscopic image based on first image information and second image information on the at least the part of the three-dimensional content (S340).

Figure 11:
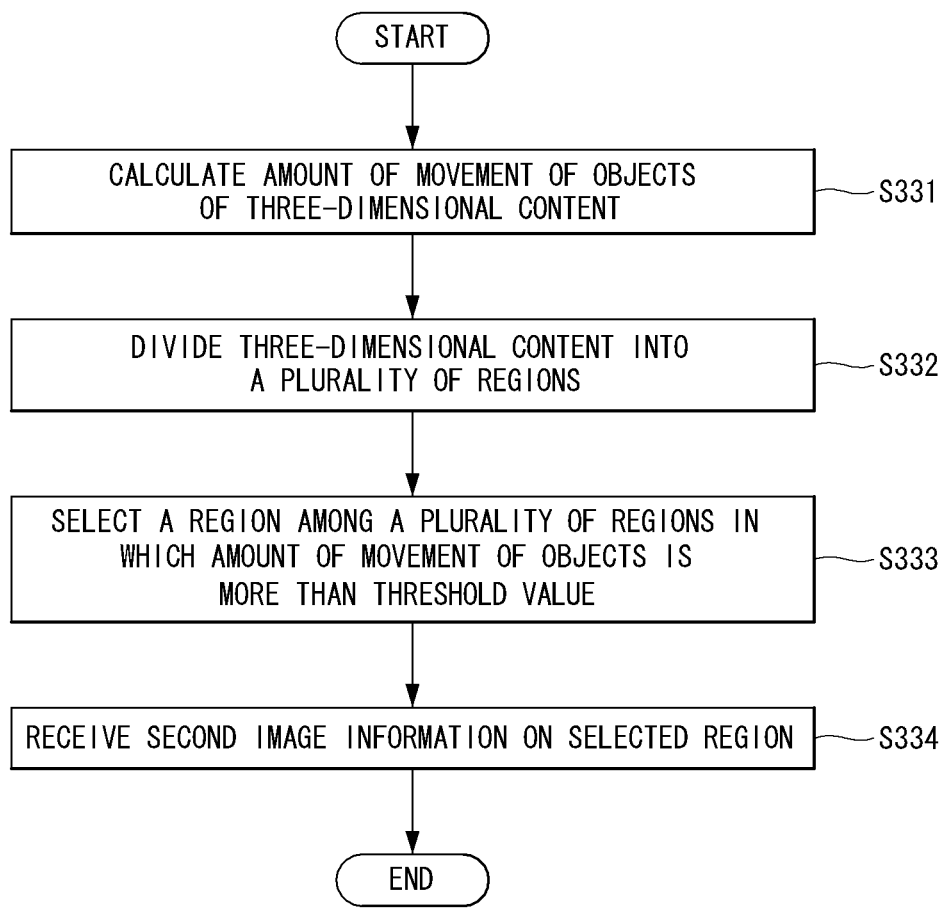
FIG. 11 is a view illustrating processes of receiving image information for providing a three-dimensional stereoscopic image in the method of FIG. 10.

FIG. 11 is a view illustrating process (S330) of receiving second image information for realizing a three-dimensional stereoscopic image in the method of FIG. 10 for displaying an image on the mobile terminal 100 (FIG. 9). The controller 180 (FIG. 1) calculates the amount of movement of objects from the three-dimensional content (S331) and divides the three-dimensional content into a plurality of regions based on the calculated amount of movement of the objects (S332). For example, the controller 180 (FIG. 1) may divide the football game image of FIG. 9 into a region corresponding to football players, a region corresponding to a ball, a subtitle region, and a background region based on the amount of movement of the objects.

The controller 180 (FIG. 1) selects a region among the plurality of regions in which the amount of movement of the objects is more than a predetermined threshold value (S333) and controls the wireless communication unit 110 (FIG. 1) to receive second image information on the selected region (S334). The controller 180 (FIG. 1) may control the display unit 151 to display the selected region as the three-dimensional stereoscopic image using the first image information received in step S300 of FIG. 10 and the second image information on the selected region that is the at least a part of the three-dimensional content.

The controller 180 (FIG. 1) may select the region corresponding to the football players and the region corresponding to the ball from the football game image of FIG. 9 and may control the wireless communication unit 110 (FIG. 1) to further receive second image information on the region corresponding to the football players and the region corresponding to the ball. The controller 180 may display the region corresponding to the football players and the region corresponding to the ball as the three-dimensional stereoscopic image using the first image information received in step S300 of FIG. 10 and the second image information received in step S330 of FIG. 10.

In FIG. 11, the controller 180 (FIG. 1) of the mobile terminal 100 (FIG. 9) selects the region displayed as the three-dimensional stereoscopic image among the three-dimensional content. However, the server 50 (FIG. 9) may determine previously which region of the plurality of regions of the three-dimensional content is to be displayed on the display unit 151 as the three-dimensional stereoscopic image. The mobile terminal 100 (FIG. 9) may first request from the server 50 (FIG. 9) only the image information required for displaying a part of the three-dimensional content as a two-dimensional image and may then further request from the server 50 (FIG. 9) information for displaying a part of the three-dimensional content as the three-dimensional stereoscopic image.

Additionally, the mobile terminal 100 (FIG. 9) may put limitations on displaying a part of the three-dimensional content currently displayed on the display unit 151 as the two-dimensional image as the three-dimensional stereoscopic image when the predetermined event is generated. As described above in relation to FIGS. 5-7, when the communication speed between the mobile terminal 100 and the server 50 is less than a threshold value, when the image processing speed of the mobile terminal 100 is less than a threshold value, or based on settings input by a user, the controller 180 (FIG. 1) may put limitations on displaying the three-dimensional content currently displayed on the display unit 151 (FIG. 9) as the two-dimensional image as the three-dimensional stereoscopic image when the event is generated.

Figure 12:
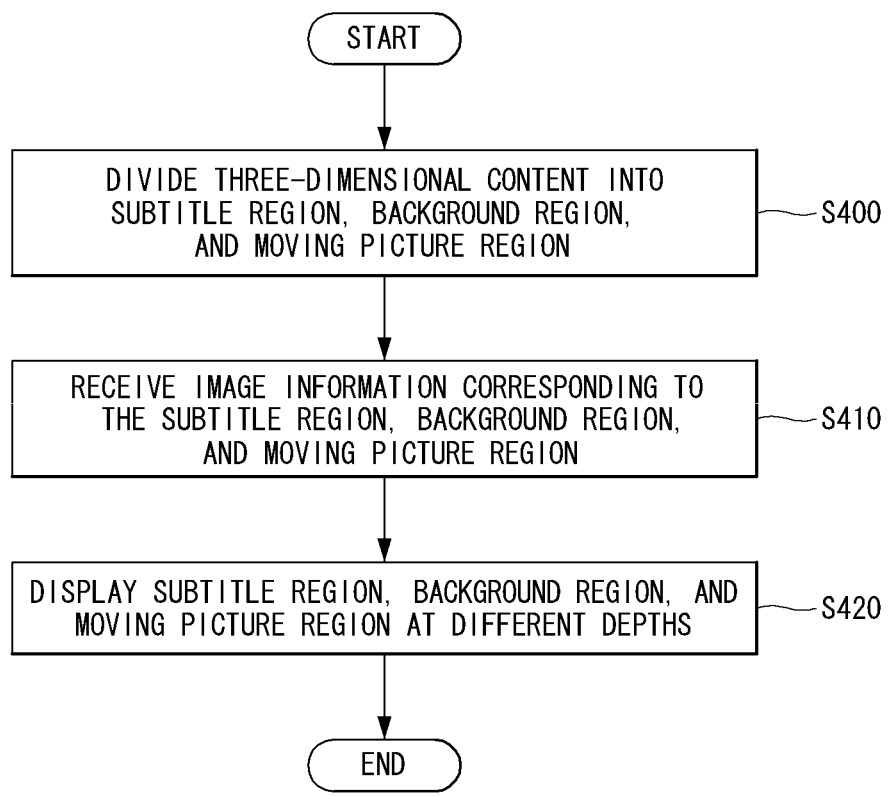
FIG. 12 is a flowchart illustrating a method of displaying an image on a mobile terminal according to an embodiment of the present invention.
Figure 13:
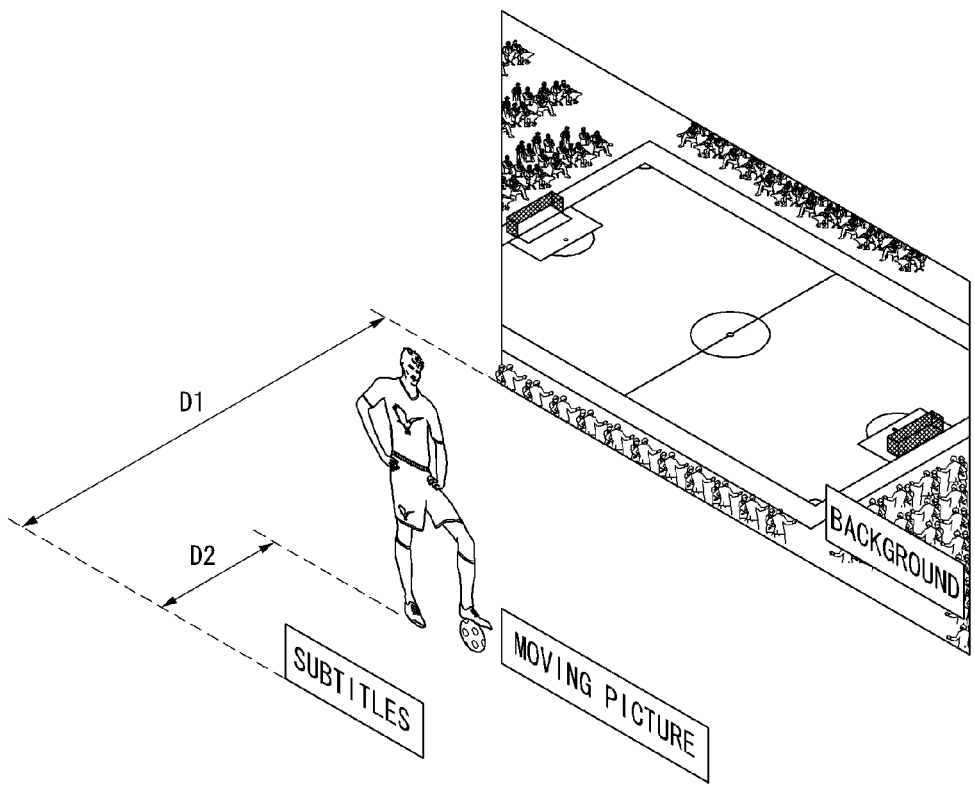
FIG. 13 is a view illustrating the control of the depth of the three-dimensional stereoscopic image in accordance with the method of FIG. 12.

FIG. 12 is a flowchart illustrating a method of displaying an image on the mobile terminal 100 according to an embodiment of the present invention. FIG. 13 is a view illustrating the control of the depth of the three-dimensional stereoscopic image in accordance with the method of displaying the image on the mobile terminal 100 of FIG. 12. The method of displaying an image on the mobile terminal 100 will be described with reference to FIGS. 1, 12, and 13.

The controller 180 (FIG. 1) of the mobile terminal 100 (FIG. 1) divides the three-dimensional content into a subtitle region, a background region, and a moving picture region (S400) and receives image information corresponding to each of the regions (S410). The moving picture region refers to a region in which the amount of movement of objects is relatively larger than in the other regions. For example, the moving picture region may include the region corresponding to the football players in the three-dimensional content displayed on the display unit 151 in FIG. 9. The controller 180 (FIG. 1) may set the depths of the regions to vary when the regions are displayed using the received image information (S420).

Referring to FIG. 13, the controller 180 (FIG. 1) may set the depth D1 from the subtitle region to the background region and the depth D2 from the subtitle region to the moving picture region to vary. For example, the subtitle region and the background region may be set to be displayed as the two-dimensional image, but at different depths, and the moving picture region may be set to be displayed as the three-dimensional stereoscopic image.

In the method of displaying the three-dimensional content on the mobile terminal 100 (FIG. 1), the user may set whether the depths of the plurality of regions are to vary and, if so, further set the depths of the plurality of regions. The user settings may be performed by the user via a touch operation performed on the display unit 151 (FIG. 1) when the display unit is a touch screen.

When depth control is used in displaying the image, power consumption by the mobile terminal 100 may be controlled. Additionally, a user may experience the optimal performance of the three-dimensional stereoscopic image by controlling the depth in displaying an image.

Figure 14:
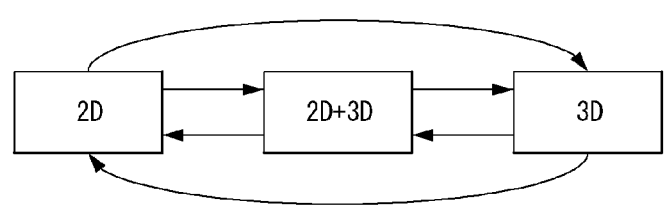
FIG. 14 is a view illustrating the methods of displaying an image on the mobile terminal according to an embodiment of the present invention as described in FIGS. 9 to 13.

FIG. 14 is a view illustrating the methods of displaying an image on the mobile terminal according to an embodiment of the present invention, as described in FIGS. 9 to 13. Referring to FIG. 14, the user of the mobile terminal 100 (FIG. 1) may display the entire three-dimensional content as a two-dimensional image, may display only a part of the three-dimensional content as a three-dimensional stereoscopic image, and may display the entire three-dimensional content as a three-dimensional stereoscopic image. Additionally, the mobile terminal 100 (FIG. 1) may convert the method of currently displaying the three-dimensional content into another display method in response to manipulation, such as a touch by a user upon a touch screen.

The above-described method of displaying an image on the mobile terminal may be written as computer programs and may be implemented in digital microprocessors that execute the programs using a computer readable recording medium. The method of controlling the mobile terminal may be executed through software. The software may include code segments that perform required tasks. Programs or code segments may also be stored in a processor readable medium or may be transmitted according to a computer data signal combined with a carrier through a transmission medium or communication network.

The computer readable recording medium may be any data storage device that may store data that may be read by a computer system. Examples of the computer readable recording medium include read-only memory (ROM), random-access memory (RAM), CD-ROMs, DVD-ROM, DVD-RAM, magnetic tapes, floppy disks, and optical data storage devices. The computer readable recording medium may also be distributed over network coupled computer systems so that the computer readable code is stored and executed via distribution.

Any reference in this specification to "one embodiment," "an embodiment," "example embodiment," etc., refers to a particular feature, structure, or characteristic described in connection with the embodiment included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other embodiments.

Although embodiments have been described with reference to a number of illustrative embodiments, it should be understood that numerous other modifications and embodiments may be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile terminal, comprising:
a display configured to display a plurality of content items;
a communication unit configured to communicate with an external apparatus; and
a controller configured to:
receive first two-dimensional image information from the external apparatus via the communication unit, wherein the first two-dimensional image information corresponds to one of a left-eye image or a right-eye image of a combined three-dimensional image;
cause the display to display a two-dimensional screen image comprising the plurality of content items displayed two-dimensionally based on the received first two-dimensional image information;
receive second two-dimensional image information from the external apparatus via the communication unit in response to a predetermined event comprising a communication speed between the external apparatus and the communication unit exceeding a threshold speed, wherein the second two-dimensional image information corresponds to another of the left-eye image or the right-eye image opposite the first two-dimensional image information;
cause the display to convert the two-dimensional screen image to the combined three-dimensional image based on a combination of the first two-dimensional image information and the second two-dimensional image information, the combined three-dimensional image comprising the plurality of content items displayed three-dimensionally; and
cause the communication unit to cease receiving the second two-dimensional image information and cause the display to convert the combined three-dimensional image to the two-dimensional screen image when the communication speed decreases to less than the threshold speed.

2. The mobile terminal of claim 1, wherein the plurality of content items comprises a web page.

3. The mobile terminal of claim 1, wherein:
the display comprises a touch screen; and
the predetermined event further comprises a touch operation performed on a region of the touch screen corresponding to one of the plurality of content items.

4. The mobile terminal of claim 1, wherein:
the predetermined event further comprises an expiration of a threshold length of time after the communication unit first communicates with the external apparatus.

5. The mobile terminal of claim 4, wherein the threshold length of time is determined based on the communication speed between the external apparatus and the communication unit.

6. The mobile terminal claim 1, wherein the controller is further configured to cause the display to display:
the plurality of content items of the displayed two-dimensional screen image in a first size; and
the plurality of content items of the combined three-dimensional image in a second size,
wherein the second size is larger than the first size.

7. The mobile terminal of claim 1, wherein the controller is further configured to
cause the display to convert the two-dimensional screen image to the combined three-dimensional image in response to the predetermined event and when an image processing speed of the mobile terminal exceeds a threshold value.

8. A method of displaying an image in a mobile terminal, the method comprising:
receiving first two-dimensional image information from an external apparatus via a communication unit, wherein the first two-dimensional image information corresponds to one of a left-eye image or a right-eye image of a combined three-dimensional image;
displaying a two-dimensional screen image comprising a plurality of content items displayed two-dimensionally based on the received first two-dimensional image information;
receiving second two-dimensional image information from the external apparatus via the communication unit in response to a predetermined event comprising a communication speed between the external apparatus and the communication unit exceeding a threshold speed, wherein the second two-dimensional image information corresponds to another of the left-eye image or the right-eye image opposite the first two-dimensional image information;
converting the two-dimensional screen image to the combined three-dimensional image based on a combination of the first two-dimensional image information and the second two-dimensional image information, the combined three-dimensional image comprising the plurality content items displayed three-dimensionally; and
ceasing receiving the second two-dimensional image information and converting the combined three-dimensional image to the two-dimensional screen image when the communication speed decreases to less than the threshold speed.

9. The method of claim 8, wherein:
the predetermined event further comprises a touch operation performed on a region of the touch screen corresponding to one of the plurality of content items.

10. The method of claim 8, wherein the predetermined event further comprises an expiration of a threshold length of time after the communication unit first communicates with the external apparatus.

* * * * *